(12) United States Patent
Sebrecht

(10) Patent No.: US 11,441,646 B2
(45) Date of Patent: Sep. 13, 2022

(54) MECHANISM FOR DRIVING BLADE ORIENTATION ADJUSTMENT BODIES

(71) Applicant: SAFRAN AIRCRAFT ENGINES, Paris (FR)

(72) Inventor: Pierre-Alain Francis Claude Sebrecht, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/339,869

(22) PCT Filed: Oct. 6, 2017

(86) PCT No.: PCT/FR2017/052742
§ 371 (c)(1),
(2) Date: Apr. 5, 2019

(87) PCT Pub. No.: WO2018/065738
PCT Pub. Date: Apr. 12, 2018

(65) Prior Publication Data
US 2019/0242465 A1 Aug. 8, 2019

(30) Foreign Application Priority Data
Oct. 7, 2016 (FR) ...................................... 16 59703

(51) Int. Cl.
*F16H 19/00* (2006.01)
*F01D 17/16* (2006.01)
*F04D 29/56* (2006.01)

(52) U.S. Cl.
CPC ......... *F16H 19/001* (2013.01); *F01D 17/162* (2013.01); *F04D 29/563* (2013.01); *F05D 2260/53* (2013.01); *F05D 2260/532* (2013.01)

(58) Field of Classification Search
CPC ................. F01D 17/162; F04D 29/563; F05D 2260/4031; F05D 2260/53; F05D 2260/532; F16H 15/14; F16H 21/14; F16H 29/14
(Continued)

(56) References Cited

U.S. PATENT DOCUMENTS 3,632,224 A * 1/1972 Wright .................. F01D 17/162
 415/149.4
4,546,606 A * 10/1985 Bouiller ................ F01D 17/162
 137/601.05
(Continued)

FOREIGN PATENT DOCUMENTS

| | | |
|---|---|---|
| EP | 1 746 260 A2 | 1/2007 |
| EP | 2 626 521 A1 | 8/2013 |
| FR | 3 025 577 A1 | 3/2016 |

OTHER PUBLICATIONS

International Search Report dated Jan. 25, 2018 in PCT/FR2017/052742 filed on Oct. 6, 2017.
(Continued)

*Primary Examiner* — Bobby Rushing, Jr.
(74) *Attorney, Agent, or Firm* — Oblon, McClelland, Maier & Neustadt, L.L.P.

(57) ABSTRACT

A mechanism for driving a first member for adjusting the orientation of the blades of a first stage of a turbine engine diffuser and a second member for adjusting the orientation of the blades of a second stage of the turbine engine diffuser, including a single drive wheel which simultaneously drives the first adjustment member and the second adjustment member and a set of gears which is arranged between the drive wheel and the two adjustment members, wherein the set of gears includes a first gearwheel which is directly coupled with the drive wheel and with the first adjustment member and which is coupled with the second adjustment
(Continued)

member with a secondary gearwheel which is directly coupled with the second adjustment member.

10 Claims, 1 Drawing Sheet

(58) Field of Classification Search
USPC .......................................... 74/436, 508, 594.1
See application file for complete search history.

(56) References Cited

U.S. PATENT DOCUMENTS

| | | | | |
|---|---|---|---|---|
| 4,657,484 A * | 4/1987 | Wakeman | ............. | B64C 11/306 415/130 |
| 5,069,604 A * | 12/1991 | Al-Sabih | ................. | F01C 1/077 123/245 |
| 5,174,716 A * | 12/1992 | Hora | ....................... | B64C 11/32 416/129 |
| 5,215,434 A * | 6/1993 | Greune | ................. | F01D 17/162 415/150 |
| 6,039,534 A * | 3/2000 | Stoner | ................... | F01D 17/162 415/150 |
| 9,200,594 B2 * | 12/2015 | Bouiller | .................... | F01D 7/00 |
| 9,533,485 B2 * | 1/2017 | Marshall | ................. | F01D 5/143 |
| 2007/0020092 A1 | 1/2007 | Giaimo et al. | | |
| 2013/0210572 A1 | 8/2013 | Coles | | |
| 2016/0069204 A1 * | 3/2016 | Izquierdo | ................. | F02C 9/20 415/1 |
| 2017/0260870 A1 | 9/2017 | Sebrecht | | |
| 2017/0276013 A1 * | 9/2017 | Suciu | .................... | F16H 49/001 |
| 2017/0276146 A1 * | 9/2017 | Suciu | ........................ | F01D 9/04 |

OTHER PUBLICATIONS

French Preliminary Search Report dated Jul. 3, 2017 in French Application 16 59703 filed on Oct. 7, 2016.

* cited by examiner

MECHANISM FOR DRIVING BLADE ORIENTATION ADJUSTMENT BODIES

TECHNICAL FIELD

The invention relates to a mechanism for driving vane orientation adjustment devices of several stages of a turbomachine guide vane assembly.

The invention relates particularly to a mechanism for driving two adjustment devices that can simultaneously drive the two adjustment devices at different displacement velocities of one adjustment device relative to the other.

STATE OF PRIOR ART

The compressor and/or the turbine of a turbomachine are composed of several stages, each stage comprising a gas flow guide vane assembly.

It is known that the orientation of vanes of guide vane assemblies can be modified as a function of operating conditions of the turbomachine, to optimise its efficiency.

According to one known embodiment, the modification to the orientation of the vanes of the guide vane assembly is controlled by means of an actuator comprising a control shaft that cooperates with a device associated with each vane or a vane orientation control box.

Although the use of a single shaft to drive the vanes of two guide vane assembly stages can limit the number of components in the turbomachine, the dimensions of this system are particularly large such that this solution must be preferred for large turbines.

The use of a control box can be adapted to all turbomachine sizes. However, this solution comprises a large number of components and this reduces the precision of the system due to accumulate clearances between the many components and the deformations of each.

Document FR-3.025.577 also disclosed a drive mechanism comprising a single toothed wheel associated with two adjustment devices and two gear stages engaged with the toothed wheel, each of which is associated with an adjustment device.

Such a drive mechanism is relatively simple and its size is limited.

However, it is complex to set up because each of the two gear stages must be positioned precisely relative to the toothed wheel and this relative position can be modified by different expansions of components of the drive mechanism, during operation of the turbomachine.

The purpose of the invention is to disclose a drive mechanism for the vane orientation adjustment means that is compact, and that is easy and reliable to implement.

PRESENTATION OF THE INVENTION

The invention discloses a drive mechanism for a first adjustment device for adjusting the orientation of the vanes of a first stage of guide vanes assembly of a turbomachine and a second adjustment device for adjusting the orientation of the vanes of a second stage of the guide vanes assembly of the turbomachine, comprising a single drive wheel that simultaneously drives the first adjustment device and the second adjustment device and a gearset that is arranged between the drive wheel and the two adjustment devices, characterised in that the gearset comprises a first toothed wheel that is directly coupled with the drive wheel and with the first adjustment device and that is coupled with the second adjustment device through a secondary toothed wheel that is directly coupled with the second adjustment device.

The use of a first toothed wheel that is or is not directly coupled with each adjustment device can limit positioning difficulties of components relative to each other. Furthermore, this drive mechanism has a limited number of components, thus reducing the mass of the drive mechanism.

Preferably, the transmission ratio between the first toothed wheel and the secondary toothed wheel is variable as a function of the angular position of the drive wheel in the turbomachine.

Preferably, the drive mechanism comprises means of coupling the first toothed wheel with the secondary toothed wheel to vary the transmission ratio.

Preferably, the coupling means are made to vary the transmission ratio non-linearly.

Preferably, the rotation axes of the first toothed wheel and of the secondary toothed wheel are parallel to each other and offset from each other by a distance less than the sum of the radii of the two wheels and one of the two wheels comprises a groove and the other wheel comprises a pin that projects in the axial direction from the principal axis of said other wheel, the pin fitting into the groove and being capable of cooperating with the groove to transmit a torque from the first toothed wheel to the secondary toothed wheel.

Preferably, the groove is formed in the first toothed wheel and the pin is carried by the secondary toothed wheel.

Preferably, the groove is oriented principally in the radial direction from the principal axis of the first toothed wheel.

The invention also relates to an aircraft turbomachine comprising two guide vane assembly stages in which the orientation of the vanes can be modified, characterised in that each guide vane assembly stage comprises a device for adjustment of the orientation of the vanes in said guide vanes assembly stage, the two adjustment devices being free to rotate inside the turbomachine around the principal axis of the turbomachine and being driven in rotation by a drive mechanism according to the invention.

Preferably, each adjustment device comprises a first toothed portion that is coupled with the first toothed wheel or the secondary toothed wheel and a second toothed portion that engages with a toothed wheel supported by each vane of the associated guide vane assembly stage.

Preferably, the first toothed portion and the second toothed portion are located on the same end of an adjustment device along the principal axis of the turbomachine and are located at two radial dimensions different from each other.

BRIEF DESCRIPTION OF THE DRAWINGS

Other characteristics and advantages of the invention will become clear after reading the detailed description given below which will be understood more easily with reference to the appended figures among which the single FIGURE is a diagrammatic representation of a drive mechanism according to the invention.

DETAILED PRESENTATION OF PARTICULAR EMBODIMENTS

Figure 1:
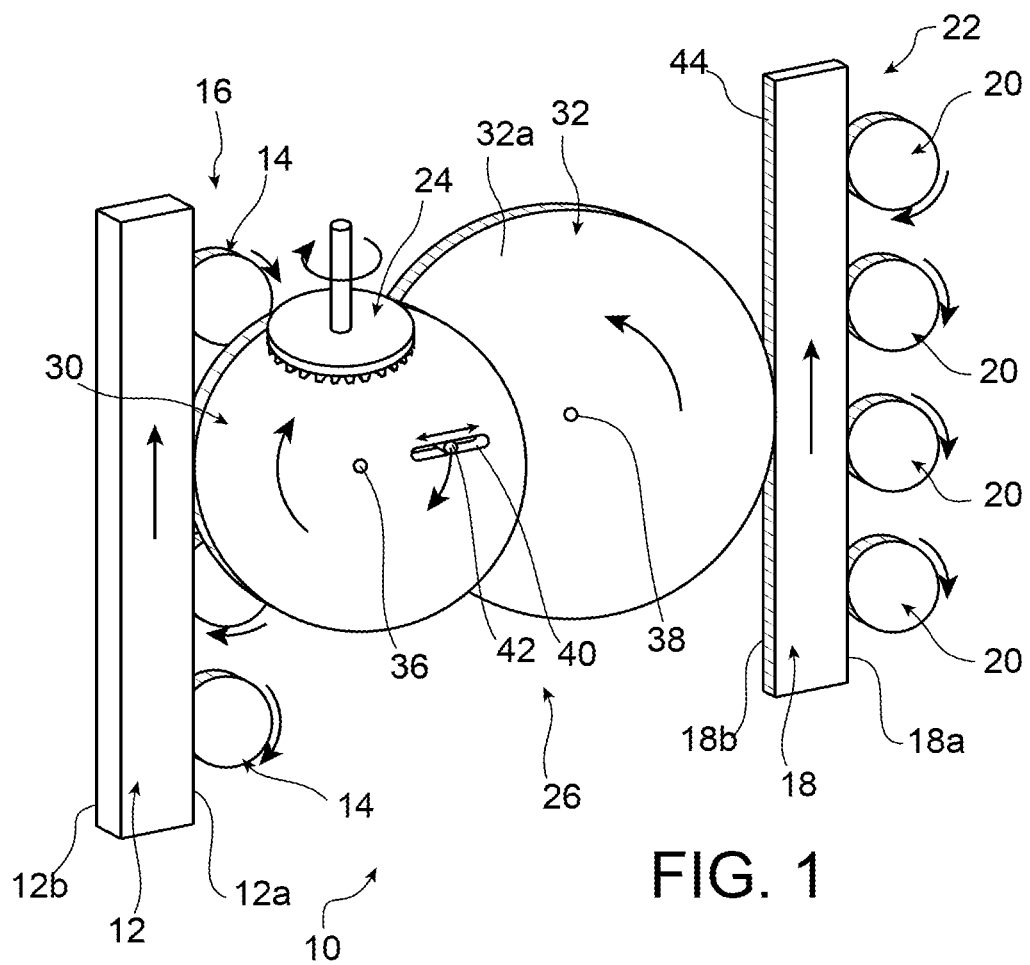
Figure 2:
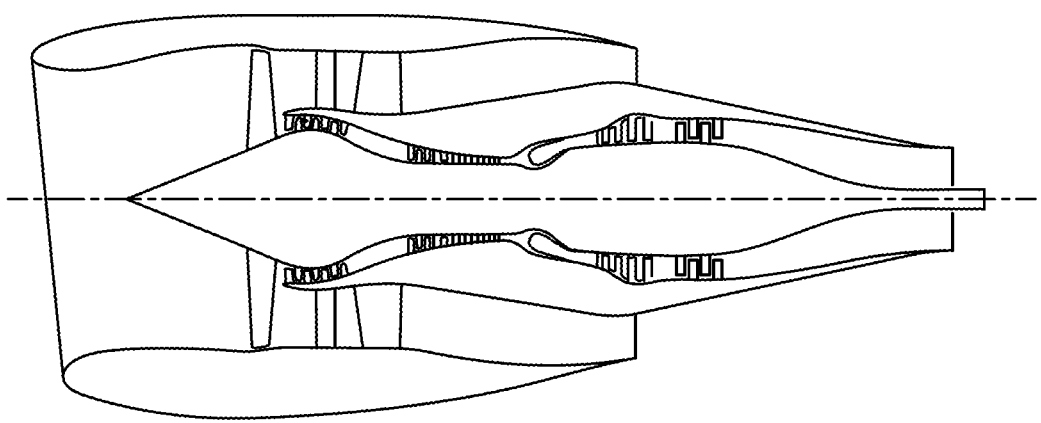

The single FIGURE shows a drive mechanism 10 for a device 12 for adjusting the orientation of the vanes 14 in a first stage 16 of a guide vanes assembly of the turbomachine and a device 18 for adjusting the orientation of the vanes 20 in a second stage 22 of the guide vanes assembly of the turbomachine.

Each of the devices 12, 18 for adjusting the orientation of the vanes 14, 20 consists of a ring associated with each stage 16, 22 of the guide vanes assembly that is free to move in rotation in the turbomachine around the principal axis of the turbomachine (not represented). A first axial end 12a, 18a of each adjustment device 12, 18 comprises a toothed portion that cooperates with a toothed wheel supported by each vane 14, 20.

Thus, rotation of an adjustment device 12, 18 in the turbomachine causes simultaneous rotation of all vanes 14, 20 of the stage 16, 22 of the guide vanes assembly associated with it.

When a change occurs in operating conditions of the turbomachine, the orientation of the vanes 14, 20 of the two stages 16, 22 of the guide vanes assembly must be modified simultaneously to optimise performances of the turbomachine. The vanes 14 of the first stage 16 of the guide vanes assembly pivot at an angle that is different from the pivot angle of the vanes 20 of the second stage 22 of the guide vanes assembly.

The drive mechanism 10 of 12, 18 is designed to simultaneously drive movement of the two adjustment devices 12, 18 and so that the displacement amplitude of the first adjustment device 12 associated with the first stage 16 of the guide vanes assembly is different from the displacement amplitude of the second adjustment device 18 associated with the second stage 22 of the guide vanes assembly.

To drive the two adjustment devices 12, 18 simultaneously, the drive mechanism 10 comprises a single drive wheel 24 that simultaneously drives the two adjustment devices 12, 18 and a gearset 26 that connects the single drive wheel 24 to the two adjustment devices 12, 18.

The gearset comprises a first toothed wheel 30 that is directly coupled to the drive wheel 24 and the first adjustment device 12.

The first toothed wheel 30 is also coupled to the second adjustment device 18 through a secondary toothed wheel 32. This secondary toothed wheel 32 is coupled directly to the second adjustment device 18.

Thus, the first toothed wheel 30 and the secondary toothed wheel 32 cooperate with each other to transmit drive forces from the drive wheel 24 as far as the second adjustment device 12.

An axial end 12a, 18b of each adjustment device 12, 18 comprises a toothed portion 44 for this purpose that cooperates with the first toothed wheel 30 or with the secondary toothed wheel 32 that is associated with it.

In this case, and non-limitatively, the vanes 14 of the first stage 16 of the guide vanes assembly and the first toothed wheel 30 cooperate with two toothed portions of the first adjustment device 12 that are located on the first axial end 12a of the first adjustment device 12. To achieve this, each of the toothed portions of the first adjustment device 12 are located on the first axial end 12a at radial positions different from each other.

It will be understood that the invention is not limited to this embodiment and that the vanes 14 of the first stage 16 of the guide vanes assembly and the first toothed wheel 30 can cooperate with two toothed portions of the first adjustment device 12 that are located on each of the first axial end 12a and the second axial end 12b of the first adjustment device 12.

The vanes 20 of the second stage 22 of the guide vanes assembly cooperate with a toothed portion of the second adjustment device 18 that is located on the first axial end 18a of the first adjustment device 18.

Due to the presence of the secondary toothed wheel 32 between the first toothed wheel 30 and the second adjustment device 18, the transmission ratio between the drive wheel 24 and the second adjustment device 18 is different from the transmission ratio between the drive wheel 24 and the first adjustment device 12.

According to another aspect of the drive mechanism, the first toothed wheel 30 and the secondary toothed wheel 32 are coupled to each other to give a variable transmission ratio that varies as a function of the angular position of the drive wheel 24, and therefore the first toothed wheel 30.

The first toothed wheel 30 and the secondary toothed wheel 32 are arranged to be parallel to each other and their corresponding rotation axes 36, 38 are parallel and are offset from each other in the radial direction. The distance between the rotation axes of the two toothed wheels 30, 32 is thus less than the sum of the radii of the two toothed wheels 30, 32.

The two wheels 32, 34 are coupled by coupling means capable of varying the transmission ratio.

In this case these means consist of an assembly including a groove 40 and a follower pin 42, each supported by either the first toothed wheel 30 or the secondary toothed wheel 32.

According to the embodiment shown on the single FIGURE, the groove 40 is formed in the first toothed wheel 30 and its principal orientation is radial with respect to the rotation axis 36 of the first toothed heel 30. The pin 42 is carried by the secondary toothed wheel 32, projecting axially relative to a radial face 32a of the secondary toothed wheel 32 facing the first toothed wheel 30.

Consequently the pin 42 is fixed relative to the secondary toothed wheel 32 and it moves as a single piece with it.

The pin 42 fits into the groove 40 and bears in contact with the internal walls of the groove.

Since the rotation axes 36, 38 of the two wheels 30, 32 respectively are offset from each other, during rotation of the first toothed wheel 30, the pin 42 displaces along the groove 40 thus modifying the distance between the pin 42 and the rotation axis 36 of the first toothed wheel 30. The transmission ratio is then modified.

It will be understood that the invention is not limited to this unique configuration of the groove 40 and the pin 42 and that the groove 40 does not have to be straight or oriented radially relative to the rotation axis 36 of the first toothed wheel 30. The shape and the orientation of the groove 40 can thus be defined so as to obtain a given law defining the value of the transmission ratio as a function of the angular position of the drive wheel 24.

Furthermore, according to the embodiment shown, the rotation axis of the drive wheel 24 is globally perpendicular to the rotation axes 36, 38 of the toothed wheels 30, 32. According to one variant embodiment, the rotation axes of the different wheels 24, 30, 32 are parallel.

The structure of the turbomachine (not shown) comprising the guide vane assembly stages 16, 22 and the drive mechanism 10 defined above is then simpler.

The invention claimed is:

1. A drive mechanism for driving a first adjustment device for adjusting the orientation of the vanes in a first stage of a guide vanes assembly of a turbomachine and for driving a second adjustment device for adjusting the orientation of the vanes in a second stage of the guide vanes assembly of the turbomachine, wherein each of the first and second adjustment devices consists of a ring associated with each stage of the guide vanes assembly, wherein a first axial end of each adjustment device comprises a toothed portion that cooperates with a toothed wheel supported by each vane, wherein the drive mechanism comprises a single drive wheel that simultaneously drives the first adjustment device and the second adjustment device and comprises a set of gears that is arranged between the drive wheel and the two adjustment devices, wherein the set of gears comprises a first toothed wheel that is directly coupled with the drive wheel and with the first adjustment device and that is coupled with the second adjustment device through a secondary toothed wheel that is directly coupled with the second adjustment device and is directly coupled with the first toothed wheel.

2. The drive mechanism according to claim 1, wherein the transmission ratio between the first toothed wheel and the secondary toothed wheel is variable as a function of the angular position of the drive wheel in the turbomachine.

3. The drive mechanism according to claim 2, comprising means of coupling the first toothed wheel with the secondary toothed wheel to vary the transmission ratio.

4. The drive mechanism according to claim 3, wherein the coupling means are made to vary the transmission ratio non-linearly.

5. The drive mechanism according to claim 4, wherein the rotation axes of the first toothed wheel and of the secondary toothed wheel are parallel to each other and offset from each other by a distance less than the sum of the radii of the two wheels and one of the two wheels comprises a groove and the other wheel comprises a pin that projects in the axial direction from the principal axis of said other wheel, the pin fitting into the groove and being capable of cooperating with the groove to transmit a torque from the first toothed wheel to the secondary toothed wheel.

6. The drive mechanism according to claim 5, wherein the groove is formed in the first toothed wheel and the pin is carried by the secondary toothed wheel.

7. The drive mechanism according to claim 6, wherein the groove is oriented principally in the radial direction from the principal axis of the first toothed wheel.

8. An aircraft turbomachine comprising two guide vane assembly stages wherein the orientation of the vanes can be modified, wherein each guide vane assembly stage comprises a device for adjustment of the orientation of the vanes in said guide vanes assembly stage, the two adjustment devices being driven in rotation by a drive mechanism according to claim 1.

9. A turbomachine according to claim 8, wherein each adjustment device comprises a first toothed portion that is coupled with either the first toothed wheel or the secondary toothed wheel and a second toothed portion that engages with a toothed wheel supported by each vane of the associated guide vane assembly stage.

10. A turbomachine according to claim 9, wherein the first toothed portion and the second toothed portion are located along the principal axis of the turbomachine and are located at two different locations from each other along a radial direction.

* * * * *